United States Patent
Seo

(10) Patent No.: US 10,492,200 B2
(45) Date of Patent: Nov. 26, 2019

(54) DEVICE TO DEVICE COMMUNICATION METHOD IN WIRELESS COMMUNICATION SYSTEM AND APPARATUS THEREFOR

(71) Applicant: LG ELECTRONICS INC., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/755,703

(22) PCT Filed: Sep. 12, 2016

(86) PCT No.: PCT/KR2016/010257
§ 371 (c)(1),
(2) Date: Feb. 27, 2018

(87) PCT Pub. No.: WO2017/048010
PCT Pub. Date: Mar. 23, 2017

(65) Prior Publication Data
US 2019/0029015 A1   Jan. 24, 2019

Related U.S. Application Data

(60) Provisional application No. 62/219,089, filed on Sep. 15, 2015, provisional application No. 62/374,014, filed on Aug. 12, 2016.

(51) Int. Cl.
*H04W 72/04* (2009.01)
*H04W 72/08* (2009.01)
*H04W 72/10* (2009.01)

(52) U.S. Cl.
CPC ... *H04W 72/0446* (2013.01); *H04W 72/0406* (2013.01); *H04W 72/085* (2013.01); *H04W 72/10* (2013.01)

(58) Field of Classification Search
CPC .......................... H04W 5/0098; H04L 1/1812
(Continued)

(56) References Cited

U.S. PATENT DOCUMENTS

2013/0336299 A1* 12/2013 Lee ...................... H04L 5/0007
370/336
2015/0063343 A1   3/2015 Abedini et al.
(Continued)

FOREIGN PATENT DOCUMENTS

WO   2015122684 A1   8/2015

OTHER PUBLICATIONS

R1-154587: 3GPP TSG RAN WG1 Meeting #82, Beijing, China, Aug. 24-28, 2015, Intel Corporation, "Priority Support for D2D Communication," pp. 1-5.
(Continued)

*Primary Examiner* — Iqbal Zaidi
(74) *Attorney, Agent, or Firm* — Dentons US LLP

(57) ABSTRACT

A method for performing D2D communication by a first user equipment in a wireless communication system according to an embodiment of the present invention comprises the steps of: configuring a monitoring window for monitoring a control signal received from a second user equipment; receiving the control signal in the monitoring window; and performing a D2D transmission on the basis of resource allocation information of the second user equipment included in the received control signal, wherein the monitoring window is configured by taking into consideration a priority of data to be transmitted in the D2D transmission.

14 Claims, 10 Drawing Sheets

(58) Field of Classification Search
USPC .......................... 370/252–339; 375/285–296
See application file for complete search history.

(56) References Cited

U.S. PATENT DOCUMENTS

| | | |
|---|---|---|
| 2015/0156757 A1 | 6/2015 | Kalhan |
| 2017/0230928 A1* | 8/2017 | Basu Mallick ... H04W 56/0015 |
| 2018/0070264 A1* | 3/2018 | Saiwai .................. H04W 72/04 |

OTHER PUBLICATIONS

R1-154052: 3GPP TSG RAN WG1 Meeting #82, Beijing, China, Aug. 24-28, 2015, ZTE, "Discussion on different priorities for D2D communication," pp. 1-4.

* cited by examiner (A) CONTROL-PLANE PROTOCOL STACK (B) USER-PLANE PROTOCOL STACK (a)

(b)

DEVICE TO DEVICE COMMUNICATION METHOD IN WIRELESS COMMUNICATION SYSTEM AND APPARATUS THEREFOR

This application is a 35 USC § 371 National Stage entry of International Application No. PCT/KR2016/010257 filed on Sep. 12, 2016, and claims priority to U.S. Provisional Application Nos. 62/219,089 filed on Sep. 15, 2015 and 62/374,014 filed on Aug. 12, 2016, all of which are hereby incorporated by reference in their entireties as if fully set forth herein.

TECHNICAL FIELD

The present invention relates to a wireless communication system, and more particularly, to a direct device-to-device (D2D) communication method in a wireless communication system and apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

The object of the present invention is to provide a direct communication method between UEs in a wireless communication system and operation related thereto It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, provided herein is a method for performing device-to-device (D2D) communication by a first user equipment (UE) in a wireless communication system, including: setting a monitoring window for monitoring a control signal from a second UE; receiving the control signal within the monitoring window; and performing D2D transmission based on resource allocation information of the second UE included in the received control signal. In this case, the monitoring window may be set by considering priority of data to be transmitted during the D2D transmission.

Additionally or alternatively, the monitoring window may be set to include at least one subframe. When the data to be transmitted during the D2D transmission has high priority, the number of subframes included in the monitoring window may increase. On the other hand, when the data to be transmitted during the D2D transmission has low priority, the number of subframes included in the monitoring window may decrease. When the data to be transmitted during the D2D transmission has the highest priority, the number of subframes included in the monitoring window may be zero.

Additionally or alternatively, when the number of subframes where monitoring is impossible within the set monitoring window is greater than a specific threshold, the method may further include resetting the set monitoring window using a subframe(s) after the subframe where monitoring is impossible.

Additionally or alternatively, the specific threshold may vary according to the priority of the data to be transmitted during the D2D transmission. When the data to be transmitted during the D2D transmission has high priority, the specific threshold may increase. On the other hand, when the data to be transmitted during the D2D transmission has low priority, the specific threshold may decrease.

In resetting the set monitoring window using the subframe(s) after the subframe where monitoring is impossible, the number of subframes included in the monitoring window to be reset may vary according to the priority of the data to be transmitted during the D2D transmission. When the data to be transmitted during the D2D transmission has high priority, the number of subframes included in the reset monitoring window may decrease. On the other hand, when the data to be transmitted during the D2D transmission has low priority, the number of subframes included in the reset monitoring window may increase.

The above-described aspects of the present invention are merely a part of preferred embodiments of the present invention. Those skilled in the art will derive and understand various embodiments reflecting the technical features of the present invention from the following detailed description of the present invention.

Advantageous Effects

According to the present invention, a UE that intends to perform D2D transmission monitors control information of another UE according to priority of D2D data in a flexible manner, and thus the UE can avoid a resource collision with another UE and at the same time, achieve D2D data transmission without any delay.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
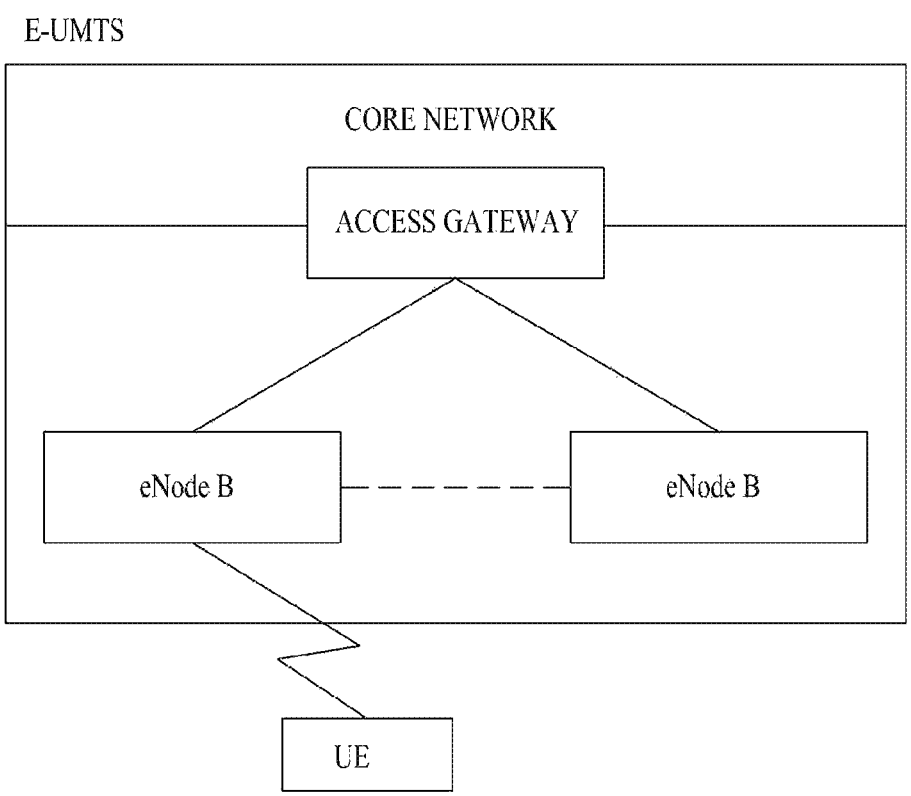
FIG. 1 is a schematic diagram of E-UMTS network structure as one example of a wireless communication system.
Figure 2:
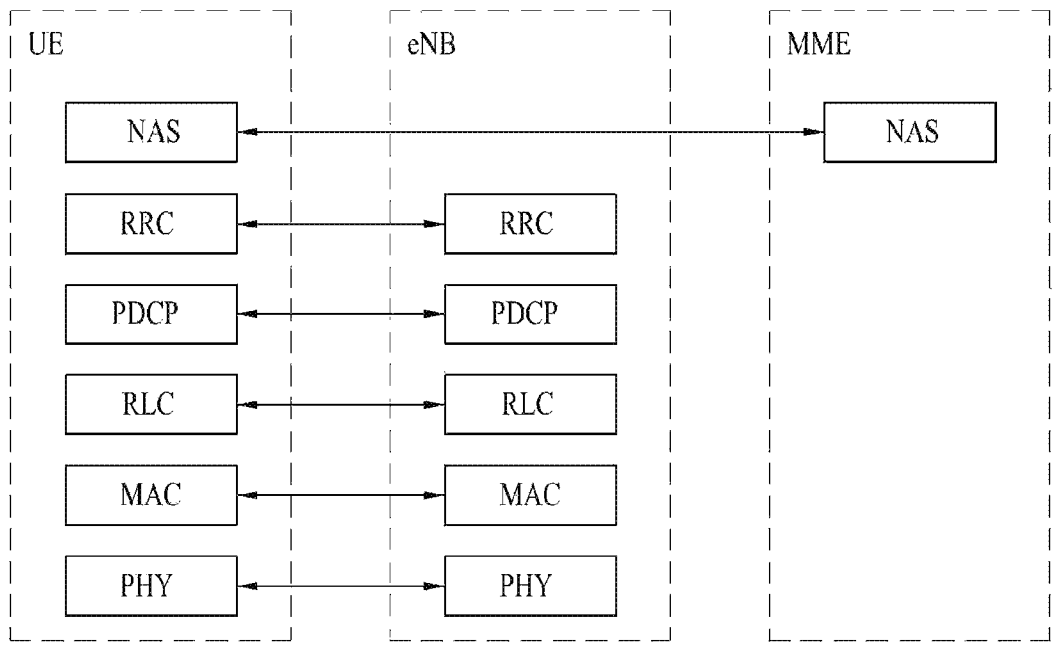
FIG. 2 is a diagram for structures of control and user planes of radio interface protocol between a 3GPP radio access network standard-based user equipment and E-UTRAN.
Figure 2:
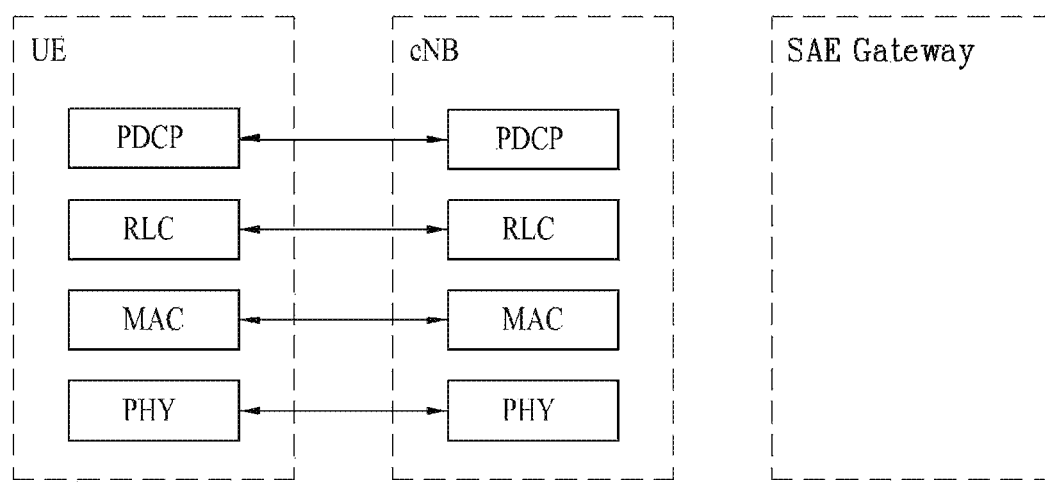

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
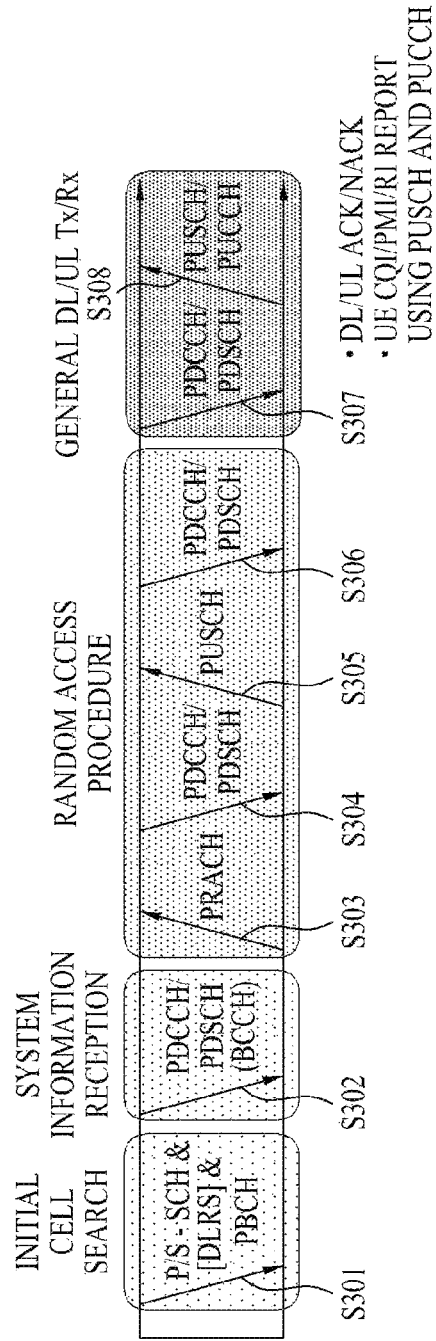
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
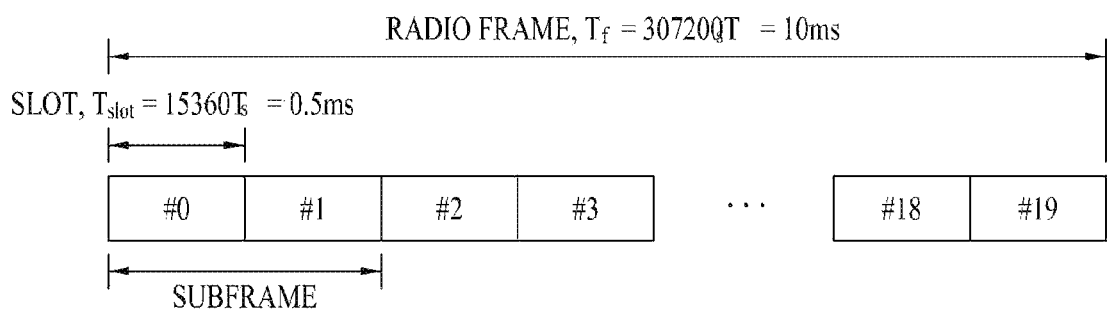
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s=1/(15\ \text{kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
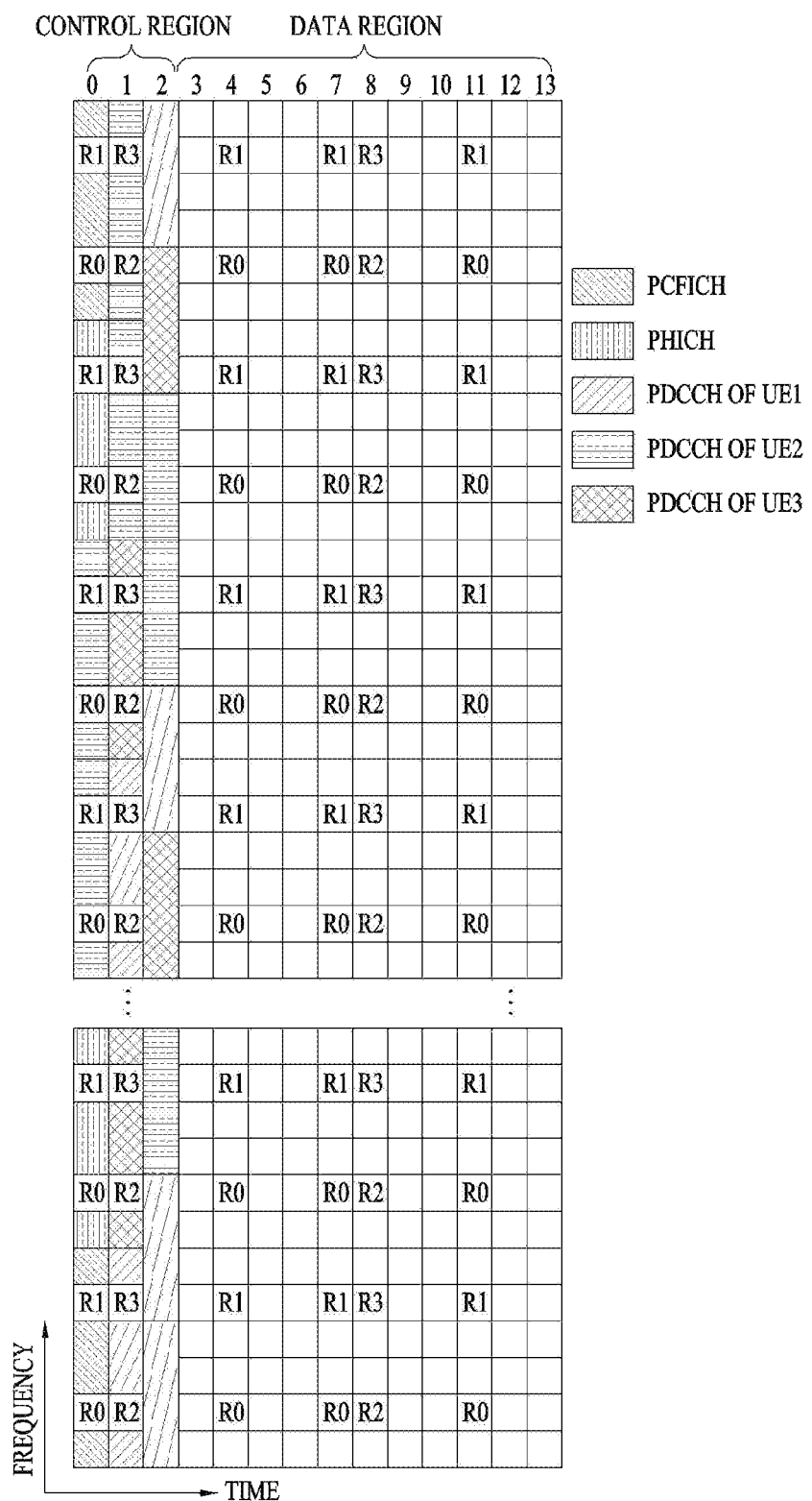
FIG. 5 is a diagram illustrating control channels included in a control region of one subframe of a downlink radio frame.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
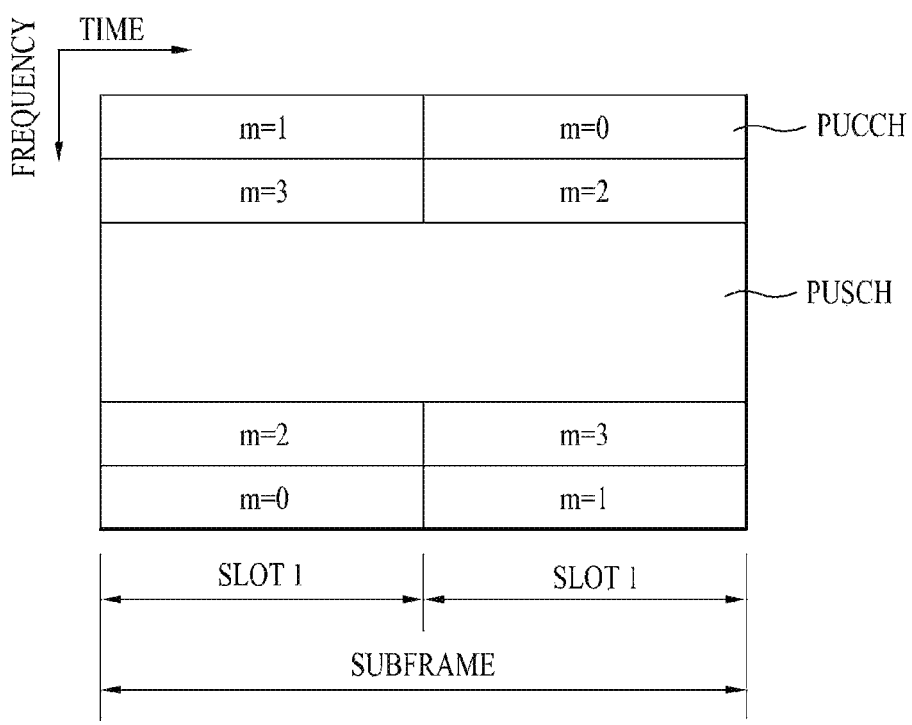
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following, D2D (device to device) communication is explained.

D2D (device to device) communication literally means communication between an electronic device and an electronic device. In a broad sense, the D2D communication means wired or wireless communication between electronic devices or communication between a device controlled by a human and a machine. Yet, recently, the D2D communication generally indicates wireless communication performed between an electronic device and an electronic device without human involvement.

According to a D2D communication scheme or a UE-to-UE communication scheme, data can be exchanged between UEs without passing through a base station. A link directly established between devices can be referred to as a D2D link or a sidelink. The D2D communication has merits in that latency is reduced compared to a legacy base station-centered communication scheme and a less radio resource is required, and the like. In this case, although a UE corresponds to a terminal of a user, if such a network device as an eNB transmits and receives a signal according to a communication scheme between UEs, the network device can be considered as a sort of UEs. In addition, an eNB can receive a D2D signal transmitted from a UE, and it is also possible to apply a signal transmission and reception method for D2D communication, which is designed to be performed by a UE, to data transmission operation from a UE to an eNB.

In order to perform D2D communication, it is necessary to obtain time synchronization and frequency synchronization between two UEs. In general, if the two UEs belong to the coverage of an eNB, the two UEs are synchronized by a PSS/SSS, CRS, or the like transmitted by the eNB and the time/frequency synchronization can be maintained between the two UEs in a level that the two UEs are able to directly transmit and receive a signal.

Meanwhile, a D2D transmission signal transmitted through a sidelink can be mainly divided into a discovery use and a communication use. A discovery signal corresponds to a signal used by a UE to determine a plurality of UEs adjacent to the UE. As an example of a sidelink channel for transmitting and receiving the discovery signal, there is a sidelink discovery channel (PSDCH: Physical Sidelink Discovery Channel). A communication signal corresponds to a signal for transmitting general data (e.g., voice, image information, etc.) to be transmitted by a UE. As an example of a sidelink channel for transmitting and receiving the communication signal, there are a physical sidelink broadcast channel (PSBCH), a physical sidelink shared channel (PSSCH), a physical sidelink control channel (PSCCH), and the like.

Figure 7:
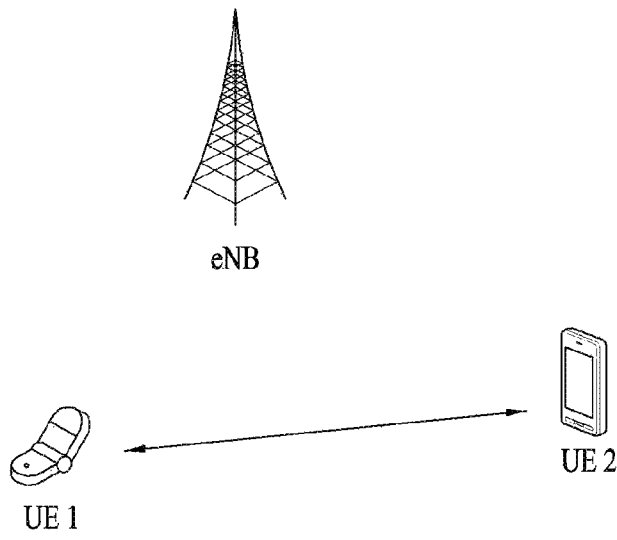
FIG. 7 is a diagram illustrating UE1 and UE2 performing D2D communication and an exemplary D2D resource pool used by the UEs.
Figure 7:
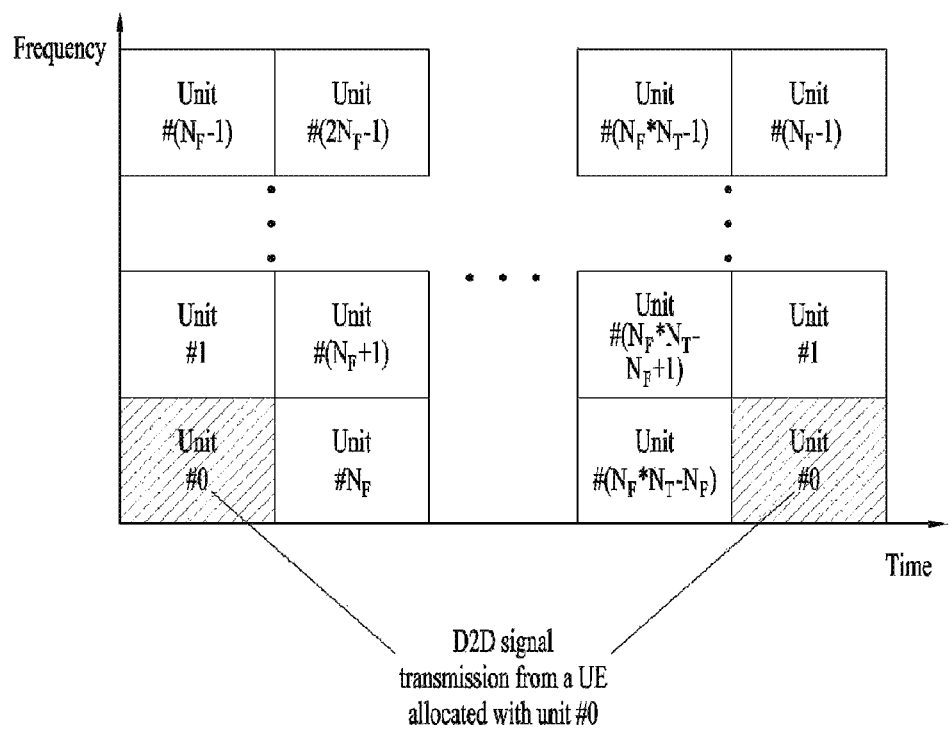

FIG. 7 shows an example of a UE1, a UE2 and a resource pool used by the UE1 and the UE2 performing D2D communication.

In FIG. 7 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

FIG. 7 (b) shows an example of configuring a resource unit. Referring to FIG. 7 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 7, one resource unit may periodically and repeatedly appear. Or, an index of a physical resource unit to which a logical resource unit is mapped may change with a predetermined pattern according to time to obtain a diversity gain in time domain and/or frequency domain.

In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel.

The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed.

The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool.

The discovery channel may correspond to a resource pool for a message that enables a neighboring UE to discover transmission UE transmitting information such as ID of the UE, and the like.

The synchronization channel may also be called as a sidelink synchronization signal or physical sidelink broadcast channel (PSBCH). The resource pool for the synchronization channel may be a resource pool for a signal/channel used by a receiving UE to match time/frequency synchronization with a transmitting UE by receiving a synchronization signal and synchronization-related information from the transmitting UE.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like.

Meanwhile, as a branch of D2D communication, vehicle-to-everything (V2X) communication has been discussed. The concept of V2X communication includes other types of communication such as vehicle-to-vehicle (V2V) communication, vehicle-to-pedestrian (V2P) communication, which is communication between a vehicle and a different type of terminal, and vehicle-to-infrastructure (V2I) communication, which is communication between a vehicle and a roadside unit (RSU).

Figure 8:
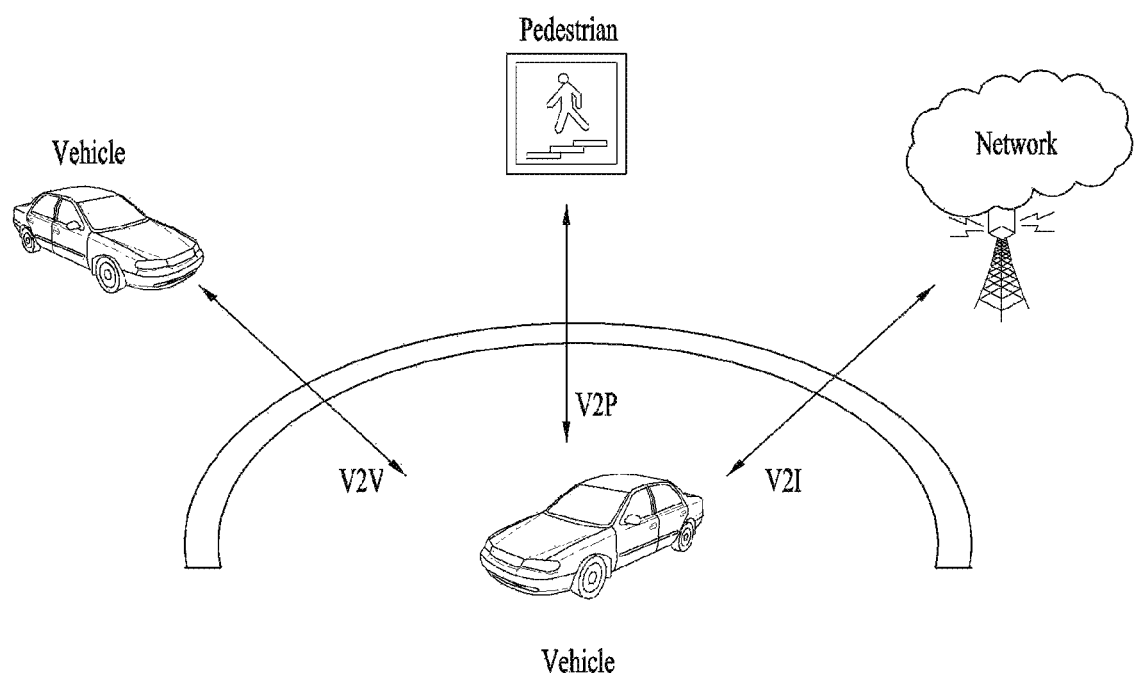
FIG. 8 is a diagram illustrating an exemplary vehicle-to-everything (V2X) communication environment.

FIG. 8 is a diagram illustrating V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby. Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

To transmit a D2D signal (or V2X signal), a UE may select appropriate resources from a resource pool and determine the selected resources as transmission resources in an autonomous way. Such an operation performed by a UE for selecting resources and performing transmission using the selected resources is effective, in particular, when there is no eNB, i.e., when resources are not separately allocated.

Meanwhile, when a UE autonomously determines resources for D2D transmission as described above, another UE may select the same resources, and it can be called a resource collision. When the resource collision occurs, performance may be degraded due to interference between D2D signals. Thus, a method for avoiding or mitigating a resource collision needs to be developed. In the case of data with high priority (for example, data containing important information or data which needs to be transmitted rapidly), a method for cancelling interference due to a resource collision between data with low priority is required.

As a method for avoiding a resource collision, a UE may read resource allocation (RA) information of a different UE to avoid use of resources that will be used by the different UE. This method is effective, in particular, when a UE that intends to transmit D2D data transmits a control signal including RA information using some time/frequency resources (before transmitting the D2D data). To this end, the UE should monitor a control signal of the different UE during a predetermined time. That is, if a UE is able to indicate transmission resources up to an $(n+k)^{th}$ subframe (SF #n+K) using a control signal transmitted in an $n^{th}$ subframe (SF #n), the UE should monitor the RA information of the different UE during all the subframes from the SF #n to the SF #n+K in order to completely avoid the resource collision and start transmission after the SF #n+K. In this case, an interval (e.g., subframe interval) in which a UE should monitor a control signal from a different UE to avoid a resource collision with the different UE can be referred to as an RA monitoring window.

Meanwhile, when the UE misses the RA information of the different UE, i.e., when the UE fails to receive the RA information, the UE may be configured to measure energy received per resource in the RA monitoring window and consider a resource with high energy among resources as the resource occupied by the different UE in order to check whether the different UE performs transmission or not. However, although this operation can reduce resource collision probability with the different UE, it has disadvantages in that the UE should perform monitoring during the predetermined time for one-time data transmission and emergency data is transmitted after a certain delay.

As a method for solving the above-described problem, the RA monitoring window may be configured differently according to priority of D2D data (to be transmitted). That is, when transmitting data with low priority, the UE may configure a long RA monitoring window. By doing so, although a time delay increases, the UE can completely avoid use of resources of the different UE. On the other hand, when transmitting data with high priority, the UE may configure a short RA monitoring window and process the transmission rapidly. As an extreme example, in the case of data with the highest priority, the UE may not monitor the RA information of the different UE (i.e., set the length of the RA monitoring window to 0) and attempt to transmit D2D data without any delay. However, since this operation may collide with the existing resource allocation, it is preferable that a wide frequency band is used so that a partial collision is offset by the remaining part.

Meanwhile, when the UE does not monitor the RA information of the different UE, the UE may be configured to perform data transmission by randomly selecting a prescribed time window within an acceptable time delay to avoid a potential collision.

Hereinafter, a description will be given of UE operations in the RA monitoring window according to embodiments of the present invention.

When the UE sets subframes from the SF #n to the SF #n+K as the RA monitoring window, the UE monitors the control signal of the different UE in the subframes included in the corresponding window. However, in some cases, the UE may not perform the monitoring operation on some subframes within the RA monitoring window.

For example, when the UE transmits a D2D signal or UL signal using carriers in a subframe within the RA monitoring window, the UE may be unable to monitor the RA information of the different UE due to the half-duplex restriction.

As another example where the UE cannot perform the monitoring operation on some subframes within the RA monitoring window, a case where the UE does not perform the monitoring operation on carriers before performing the reception operation on the corresponding carriers may be considered. For example, when the UE changes operation carriers while operating on other carriers rather than the corresponding carriers, the UE may be unable to perform the monitoring operation on the subframes within the RA monitoring window.

In these cases, the resource collision may occur because the UE fails to monitor the RA information of the different UE in the corresponding subframes. To overcome this problem, relevant UE operation can be designed according to one of the following methods.

As a first method, if there is at least one subframe where the UE is unable to perform monitoring within the RA monitoring window, the UE may regenerate the RA monitoring window. That is, when the RA monitoring window includes the subframes from the SF #n to the SF #n+K, if the UE is unable to perform the RA monitoring operation on SF #n+x, which is a subframe between the SF #n to SF #n+K, the UE may reset the RA monitoring window as subframes from SF #n+x+1 (i.e., a subframe next to the subframe where the RA monitoring operation is impossible) to SF #n+x+1+K. By doing so, the UE can monitor the RA information of the different UE in the RA monitoring window at all times, thereby reducing the resource collision probability.

As a second method, an upper bound (i.e., threshold) can be imposed on the number (or percentage) of subframes where monitoring is impossible within the RA monitoring window. When the number of subframes where monitoring is impossible is less than the upper bound, the UE maintains the existing RA monitoring window. Otherwise, the UE may regenerate the RA monitoring window. In this case, the upper bound of the number (or percentage) of subframes where monitoring is impossible may vary according to priority of D2D data (to be transmitted). When D2D data has higher priority, the upper bound may increase. As an extreme example, if the corresponding upper value is equal to the number of subframes within the RA monitoring window, the configured window is maintained irrespective of whether the UE can actually perform monitoring. While the configured window is maintained, if the number (or percentage) of subframes where monitoring is impossible within the RA monitoring window exceeds the upper bound, the UE may perform transmission without monitoring the RA information of the different UE as described above so that the UE can maintain a time delay at the acceptable level.

In the above-described methods, in the case of data that needs to be transmitted without a long time delay (i.e., data with high priority), even if there are insufficient subframe where monitoring is possible, the RA monitoring window may not be reset unlimitedly. In this case, the UE may be configured to skip monitoring of the RA information of the different UE and transmit data immediately as described above (of course, the UE may perform the operation of selecting resources randomly within the acceptable time delay). When the UE operates according to the above-described first method, if there is at least one subframe where monitoring is impossible within the RA monitoring window, the UE may skip monitoring of the RA information of the different UE and transmit data immediately. When the UE operates according to the above-described second method, if the number of subframes where monitoring is impossible within the RA monitoring window is equal to or less than a predetermined level, the UE may operate as described above.

Although the above methods are described on the assumption that when the RA monitoring window is reset, the length of the reset RA monitoring window is equal to that before reset, this can also be generalized. For example, to reduce the effect of a time delay caused by resetting of the RA monitoring window, the length of the reset RA monitoring window may be shorter than that of the previous RA monitoring window. Even in this case, the speed or rate of decrease in the length of the reset RA monitoring window may vary depending on priority of D2D data. That is, in the case of data with high priority, the length of the RA monitoring window may be configured to decrease at higher speed.

In addition, the above operation is described by assuming that D2D data or a control signal can be transmitted in all subframes, but it is not limited thereto. If transmission of D2D data or a control signal is possible in some subframes only, the RA monitoring window may be adjusted based on the corresponding subframes. For example, if D2D data transmission is possible in each odd-numbered subframe only, the length of the RA monitoring window may be doubled compared to when D2D data can be transmitted in all subframes. This is because to maintain the number of subframes where transmission of D2D data/control signal can be performed within the RA monitoring window. By doing so, the present invention can be easily applied when it is indicated that data will be actually transmitted in some subframes where D2D data transmission is allowed (e.g., subframes included in a resource pool) through one-time transmission of a D2D control signal.

Figure 9:
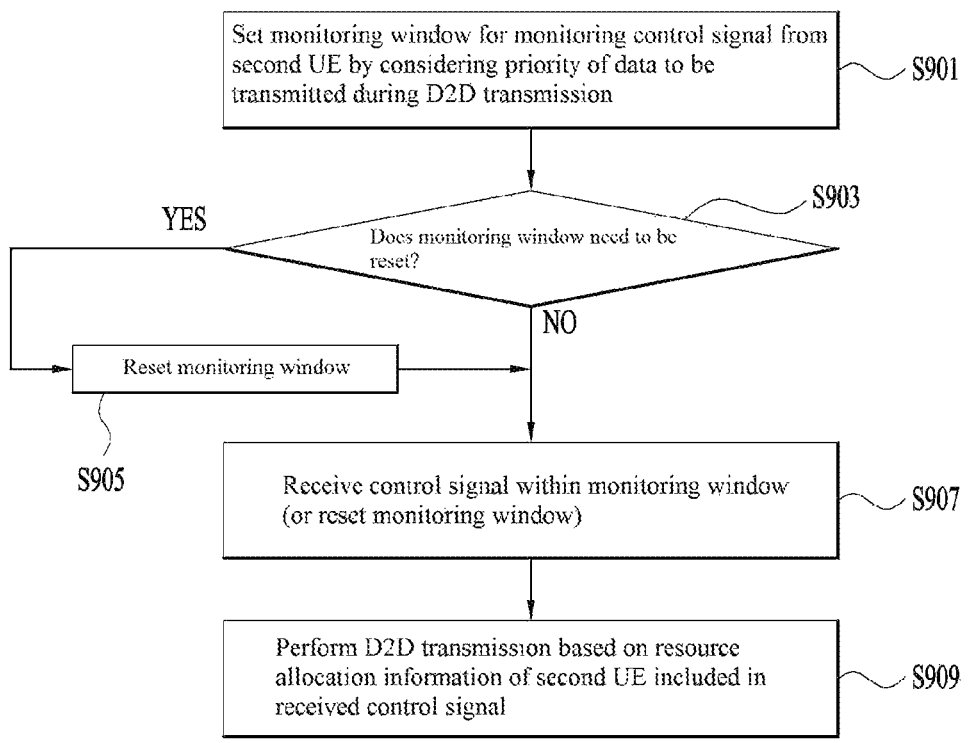
FIG. 9 illustrate an exemplary operation performed by a UE for performing D2D communication according to an embodiment of the present invention.

FIG. 9 illustrate an exemplary operation performed by a UE for performing D2D communication according to an embodiment of the present invention.

Referring to FIG. 9, a UE that intends to perform D2D transmission (hereinafter referred to as a first UE) may set a monitoring window for monitoring a control signal from another UE (hereinafter referred to as a second UE) [S901]. In some embodiments, the monitoring window may include at least one subframe.

Meanwhile, the monitoring window may be set by considering priority of data to be transmitted during the D2D transmission. As a particular example, when the data to be transmitted during the D2D transmission has high priority, the number of subframes included in the monitoring window may increase. On the contrary, when the data to be transmitted during the D2D transmission has low priority, the number of subframes included in the monitoring window may decrease. If the data to be transmitted during the D2D transmission has the highest priority, the number of subframes included in the monitoring window may be zero. That is, in this case, the first UE may transmit D2D data immediately without monitoring the control signal from the second UE.

Meanwhile, the first UE may determine whether the monitoring window needs to be reset [S903]. If it is determined that the monitoring window needs to be reset, the first UE may reset the monitoring window [S905]. Although FIG. 9 shows that steps S903 and S905 are performed, steps 903 and S905 may be skipped.

In some embodiments, whether the monitoring window needs to be reset may be determined based on the number of subframes where monitoring is impossible within the set monitoring window. For example, only when the number of subframes where monitoring is impossible within the set monitoring window is greater than a specific threshold, the first UE may reset the set monitoring window using a subframe(s) after the subframe where monitoring is impossible. In this case, the specific threshold may vary according to the priority of the data to be transmitted during the D2D transmission. For example, when the data to be transmitted during the D2D transmission has high priority, the specific threshold may increase. On the contrary, when the data to be transmitted during the D2D transmission has low priority, the specific threshold may decrease.

When the monitoring window is reset, the number of subframes included in the monitoring window to be reset may be identical to that in the current monitoring window. However, the present invention is not limited thereto.

That is, when the monitoring window is reset, the number of subframes included in the monitoring window to be reset may vary according to the priority of the data to be transmitted during the D2D transmission. For example, when the data to be transmitted during the D2D transmission has high priority, the number of subframes included in the reset monitoring window may decrease. On the contrary, when the data to be transmitted during the D2D transmission has low priority, the number of subframes included in the reset monitoring window may increase.

Thereafter, the first UE may receive the control signal within the monitoring window (or the reset monitoring window if the monitoring window is reset) [S907] and then perform the D2D transmission based on resource allocation (RA) information of the second UE included in the received control signal. In other words, the first UE may perform the D2D transmission using resources that do not collide with those allocated for the second UE.

As described above, when a UE that intends to perform D2D transmission monitors control information of another UE in a flexible manner based on priority of D2D data, the UE can avoid a resource collision with another UE and at the same time, achieve D2D data transmission without any delay.

Figure 10:
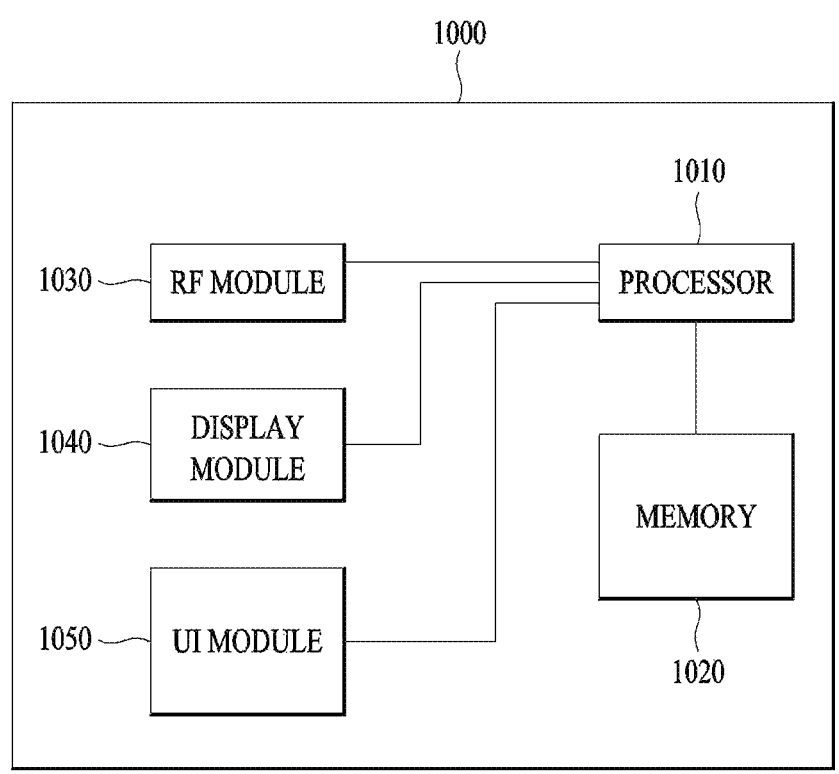
FIG. 10 is a block diagram for an example of a communication device according to one embodiment of the present invention.

FIG. 10 is a block diagram for an example of a communication device according to one embodiment of the present invention.

Referring to FIG. 10, a communication device 1000 may include a processor 1010, a memory 1020, an RF module 1030, a display module 1040, and a user interface module 1050.

Since the communication device 1000 is depicted for clarity of description, prescribed module(s) may be omitted in part. The communication device 1000 may further include necessary module(s). And, a prescribed module of the communication device 1000 may be divided into subdivided modules. A processor 1010 is configured to perform an operation according to the embodiments of the present invention illustrated with reference to drawings. In particular, the detailed operation of the processor 1010 may refer to the former contents described with reference to FIG. 1 to FIG. 9

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of informations. And, the display module 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The method for allocating resources for direct D2D communication in a wireless communication system and apparatus therefor are described with reference to examples applied to 3GPP LTE system, the method and apparatus can be applied to various wireless communication systems as well as the 3GPP LTE system.

What is claimed is:

1. A method for performing device-to-device (D2D) communication by a first user equipment (UE) in a wireless communication system, the method comprising:

configuring a monitoring window for monitoring a control signal from a second UE;

receiving the control signal within the monitoring window; and performing D2D transmission based on resource allocation information of the second UE included in the received control signal, wherein the monitoring window is configured by considering priority of data to be transmitted during the D2D transmission, wherein when the number of subframes where monitoring is impossible within the configured monitoring window is greater than a specific threshold, the configured monitoring window is re-configured based on at least one subframe after the subframe where monitoring is impossible, and wherein when the configured monitoring window is re-configured, the number of subframes included in the monitoring window to be re-configured varies according to the priority of the data to be transmitted during the D2D transmission.

2. The method of claim 1, wherein the monitoring window is configured to include at least one subframe.

3. The method of claim 2, wherein when the data to be transmitted during the D2D transmission has high priority, the number of subframes included in the monitoring window increases, and wherein when the data to be transmitted during the D2D transmission has low priority, the number of subframes included in the monitoring window decreases.

4. The method of claim 1, wherein when the data to be transmitted during the D2D transmission has the highest priority, the number of subframes included in the monitoring window is zero.

5. The method of claim 1, wherein the specific threshold varies according to the priority of the data to be transmitted during the D2D transmission.

6. The method of claim 5, wherein when the data to be transmitted during the D2D transmission has high priority, the specific threshold increases, and wherein when the data to be transmitted during the D2D transmission has low priority, the specific threshold decreases.

7. The method of claim 1, wherein when the data to be transmitted during the D2D transmission has high priority, the number of subframes included in the re-configured monitoring window decreases, and wherein when the data to be transmitted during the D2D transmission has low priority, the number of subframes included in the re-configured monitoring window increases.

8. A first user equipment (UE) for performing device-to-device (D2D) communication with a second UE in a wireless communication system, the first UE comprising:

a radio frequency (RF) unit; and a processor configured to control the RF unit, wherein the processor is configured to configure a monitoring window for monitoring a control signal from the second UE, receive the control signal within the monitoring window, and perform D2D transmission based on resource allocation information of the second UE included in the received control signal, wherein the monitoring window is configured by considering priority of data to be transmitted during the D2D transmission, wherein when the number of subframes where monitoring is impossible within the configured monitoring window is greater than a specific threshold, the processor re-configures the configured monitoring window based on at least one subframe after the subframe where monitoring is impossible, and wherein when the configured monitoring window is re-configured, the number of subframes included in the monitoring window to be re-configured varies according to the priority of the data to be transmitted during the D2D transmission.

9. The first UE of claim 8, wherein the monitoring window is configured to include at least one subframe.

10. The first UE of claim 9, wherein when the data to be transmitted during the D2D transmission has high priority, the number of subframes included in the monitoring window increases, and wherein when the data to be transmitted during the D2D transmission has low priority, the number of subframes included in the monitoring window decreases.

11. The first UE of claim 8, wherein when the data to be transmitted during the D2D transmission has the highest priority, the number of subframes included in the monitoring window is zero.

12. The first UE of claim 8, wherein the specific threshold varies according to the priority of the data to be transmitted during the D2D transmission.

13. The first UE of claim 12, wherein when the data to be transmitted during the D2D transmission has high priority, the specific threshold increases, and wherein when the data to be transmitted during the D2D transmission has low priority, the specific threshold decreases.

14. The first UE of claim 8, wherein when the data to be transmitted during the D2D transmission has high priority, the number of subframes included in the re-configured monitoring window decreases, and wherein when the data to be transmitted during the D2D transmission has low priority, the number of subframes included in the re-configured monitoring window increases.

* * * * *